Oct. 3, 1939.     M. S. CROFT     2,174,778
EXHIBITING AND VIEWING APPARATUS
Filed May 17, 1937
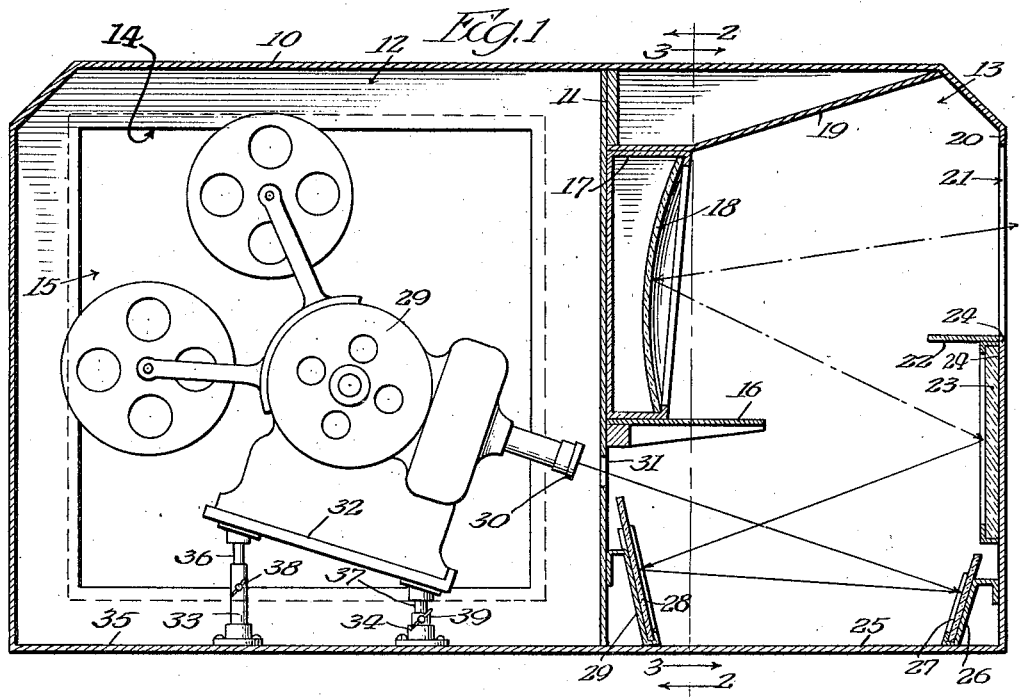
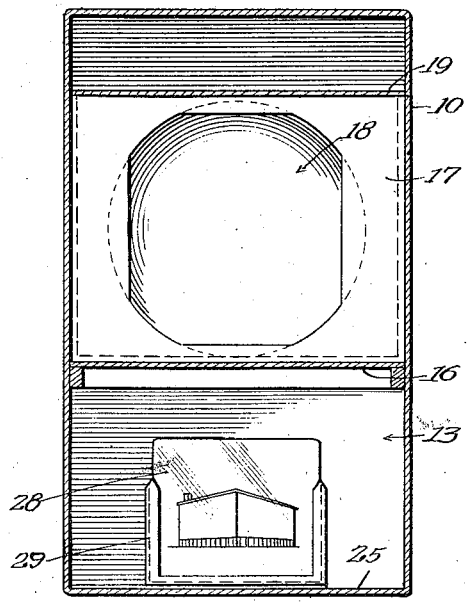 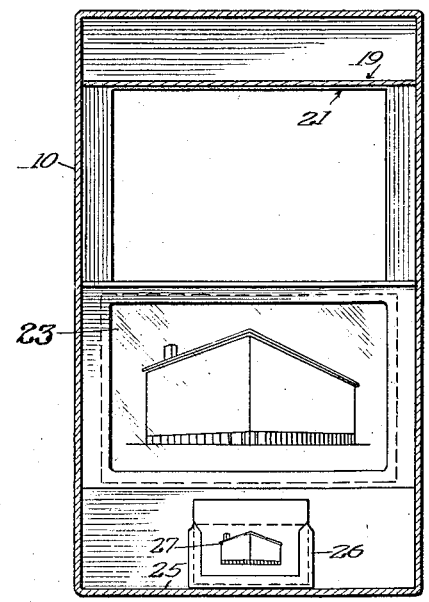
Inventor:
Martin S. Croft
By [signature] Atty.

Patented Oct. 3, 1939

2,174,778

UNITED STATES PATENT OFFICE 2,174,778

EXHIBITING AND VIEWING APPARATUS

Martin S. Croft, Chicago, Ill.

Application May 17, 1937, Serial No. 142,956

3 Claims. (Cl. 88—24)

This invention relates to improvements in exhibiting and viewing apparatus, particularly adapted, though not necessarily limited, in its use for exhibiting and viewing motion picture films, film roll pictures, and other visual material which may be projected upon a screen, and one of the objects of the invention is to provide an improved apparatus of this character, which individualizes the study of visual material, and facilitates the viewing of such material in a fully lighted room as in broad daylight, thus enabling the observer to make notes as the picture is being viewed.

Furthermore, this improved apparatus is compact in construction and portable, so that it may be readily transported from place to place, as may be necessary or desirable, thus providing a motion picture viewing apparatus which may be used in any home and school room, without disarranging or darkening the room.

Another feature of the invention is that it provides a viewing and exhibiting apparatus into which most of the conventional projection machines now on the market, and particularly any 16 mm. motion picture projector, may be inserted, thereby increasing the usefulness of such available equipment.

A further object is to provide improved means whereby the image will be enlarged and the various parts of the apparatus are so disposed with respect to each other that the enlarged image will be produced in a short distance and within a compact and comparatively small apparatus.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a vertical sectional view of an apparatus of this character constructed in accordance with the principles of this invention.

Figure 2 is a vertical sectional view taken on line 2—2, Figure 1, looking in the direction of the arrows.

Figure 3 is a vertical sectional view taken on line 3—3, Figure 1, looking in the direction of the arrows.

The apparatus consists essentially of a box or housing 10 which may be of any desired size and configuration and is provided with a partition 11 dividing the same into two chambers 12—13; the chamber 12 constitutes a projection apparatus chamber, and is provided with an opening 14 in one wall thereof to permit insertion of the apparatus and to also permit access thereto. Such opening is closed by means of a suitable closure 15.

The chamber 13 contains the viewing and reflecting mechanism and in this chamber there is provided a horizontal support 16 which is mounted upon the partition 11 and projects for a substantial distance therebeyond. This support 16 is spaced above the bottom of the chamber, and mounted upon the support and preferably in contact with the partition 11 is a frame 17 in which is mounted a concaved mirror or reflector 18. The reflector 18 terminates short of the top of the chamber and a wall 19 extends from the upper part of the frame 17 toward and terminates adjacent the front wall 20 of the chamber, and the wall 19 preferably inclines upwardly and outwardly from the top of the mirror or reflector 18.

The mirror 18 is of suitable size and is so arranged and inclined to the vertical that it receives the image from the screen.

The front wall 20 is provided with a view opening 21, of any desired size, which is disposed in the upper part of the wall. A shelf or shield 22 is carried by the front wall 20 and projects laterally therefrom and into the chamber 13 for any desired distance, the shield being disposed adjacent the lower edge of the view opening 21.

Beneath the shield 22 is a screen 23 of any desired type and construction, and this screen is flat and preferably maintained in position by means of a frame 24. The screen terminates a considerable distance above the bottom 25 of the chamber or compartment 13, and disposed below the screen is a frame 26 in which is arranged a flat mirror or reflector 27, the reflector being arranged in a plane inclined to the vertical.

Within the chamber 13 and preferably adjacent the partition 11 and in alinement with the mirror or reflector 27, is arranged another flat mirror or reflector 28 which is held in position by means of a suitable frame or support 29. The reflector 28 is also arranged in a plane inclined to the vertical, and is disposed in alinement and spaced from the mirror or reflector 27. The screen 23 is arranged at such an angle as to partially correct the distortion of the image created by the variations in the reflecting angles of the reflectors 27—28.

Within the chamber or compartment 12 is arranged a suitable projection apparatus 29 which may be of any suitable type and construction, in the present exemplification of the invention being diagrammatically illustrated as a projection apparatus having a projecting lens 30 which is arranged adjacent an opening 31 in the partition 11, and which opening 31 is arranged beneath the shelf or support 16 and above the reflector or mirror 28.

The lens in the projection apparatus is so positioned with respect to the opening 31 that the image projected therefrom will be directed against the mirror or reflector 27 and it is then reflected to the mirror 28, the latter reflecting the image upon the screen 23. The image thus projected upon the screen 23 will be considerably enlarged, and such enlargement will be accomplished within the relatively small chamber 13 of the apparatus by means of the arrangement of the reflectors 27—28, and will be further reflected and enlarged by the concaved mirror or reflector 18 to the view opening 21. The mirror or reflector 18 is preferably slightly inclined to the vertical.

The walls of the chamber 13 in which the reflector and screen are arranged, are preferably blackened so that any stray light rays within the chamber will not be reflected. The partition 22 is disposed above the screen 23 to prevent external light rays which enter through the view opening 21, from falling upon the screen, thus resulting in the production of a sharply defined image on the screen.

The projecting apparatus is preferably mounted upon a support 32, which may be of any suitable character so as to provide a firm support and proper positioning of the projection apparatus in alinement with the reflector 27.

To that end there may be provided sockets or tubular members 33—34 secured to the bottom 35 of the chamber 12. Projections 36—37 may be secured to the bottom of the support 32, and these projections 36—37 respectively telescope into the tubular members 33 and 34, so that the support 32 may be raised or lowered with respect to the bottom 35 of the chamber, and when adjusted the parts may be held in such adjusted position by means of clamping devices, such as thumb nuts 38—39, which latter co-operate with the projections 36—37.

It will therefore be manifest that with this improved apparatus a large image will be produced by means of a plurality of reflectors and screen properly disposed within a relatively compact space.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. An apparatus of the character described embodying a housing cabinet having two compartments separated by a transverse partition, a projection device in one compartment, a projection aperture in the partition in optical alinement with the projector, a pair of opposed plane mirrors in the second compartment in optical alinement with the projector, a projection screen adjacent the front wall of the second compartment, a supporting platform on the partition positioned above the projection aperture and extending into the second compartment, a concave mirror supported by said platform with the said screen at one conjugate focus thereof, and a view opening in the front wall of the said second compartment positioned above said screen whereby an enlarged image of the picture projected on the screen may be viewed by an observer looking through said view opening toward said concave mirror.

2. An apparatus of the character described embodying a housing cabinet having two compartments separated by a transverse partition, a projection device in one compartment, a projection aperture in the partition in optical alinement with the projector, a pair of opposed plane mirrors in the second compartment in optical alinement with the projector, a projection screen adjacent the front wall of the second compartment, a supporting platform on the partition positioned above the projection aperture and extending into the second compartment, a concave mirror supported by said platform with the said screen at one conjugate focus thereof, a view opening in the front wall of the said second compartment positioned above said screen whereby an enlarged image of the picture projected on the screen may be viewed by an observer looking through said view opening toward said concave mirror, and a shield projecting from the wall adjacent which said screen is disposed, said shield being disposed above the screen and extending into the said second compartment to protect said screen from light rays entering the said view opening.

3. An apparatus of the character described embodying a housing cabinet having two compartments separated by a transverse partition, a projection device in one compartment, a projection aperture in the partition in optical alinement with the projector, a pair of opposed plane mirrors in the second compartment in optical alinement with the projector, a projection screen adjacent the front wall of the second compartment, a supporting platform on the partition positioned above the projection aperture and extending into the second compartment, a concave mirror supported by said platform with the said screen at one conjugate focus thereof, a view opening in the front wall of the said second compartment positioned above said screen whereby an enlarged image of the picture projected on the screen may be viewed by an observer looking through said view opening toward said concave mirror, said projection device embodying a projection lens, a support upon which the projection device is mounted, and means for adjusting said support to vary the angular position of said projecting lens with respect to the front mirror.

MARTIN S. CROFT.